United States Patent
Hsu et al.

(10) Patent No.: US 8,532,857 B2
(45) Date of Patent: Sep. 10, 2013

(54) POWER-ASSISTED SYSTEM FOR BICYCLE

(75) Inventors: Yuan-Fang Hsu, Hsinchu (TW); Chi-Chang Cheng, New Taipei (TW)

(73) Assignee: J.D. Components Co., Ltd., Chang Hua Hsien (TW)

( * ) Notice: Subject to any disclaimer, the term of this patent is extended or adjusted under 35 U.S.C. 154(b) by 0 days.

(21) Appl. No.: 13/338,761

(22) Filed: Dec. 28, 2011

(65) Prior Publication Data

US 2012/0226400 A1    Sep. 6, 2012

(30) Foreign Application Priority Data

Dec. 31, 2010   (TW) ................................ 99147291 A

(51) Int. Cl.
*B60L 9/00*    (2006.01)

(52) U.S. Cl.
USPC ............................................................. 701/22

(58) Field of Classification Search
USPC .......................................................... 701/22
See application file for complete search history.

(56) References Cited

U.S. PATENT DOCUMENTS

| | | | | |
|---|---|---|---|---|
| 4,434,801 A * | 3/1984 | Jiminez et al. | ................. | 600/502 |
| 6,580,188 B2 * | 6/2003 | Endo et al. | ................. | 310/67 A |
| 7,357,209 B2 * | 4/2008 | Kokatsu et al. | ............ | 180/206.2 |
| 2006/0100045 A1 * | 5/2006 | Fukuda | ............................ | 474/70 |
| 2008/0071436 A1 * | 3/2008 | Dube et al. | ...................... | 701/22 |
| 2009/0164076 A1 * | 6/2009 | Vasiliotis et al. | ............... | 701/55 |

FOREIGN PATENT DOCUMENTS

| JP | 2000-168672 A | 6/2000 |
|---|---|---|
| JP | 2004-243920 A | 9/2004 |

* cited by examiner

*Primary Examiner* — Tuan C. To
*Assistant Examiner* — Aaron L Troost
(74) *Attorney, Agent, or Firm* — Browdy and Neimark, PLLC

(57) ABSTRACT

A power-assisted system is to be assembled to a derailleur-equipped bicycle for providing an auxiliary force to the bicycle. The power-assisted system includes: a microcomputer; a pedaling-rate sensor; a bicycle-speed sensor; a shift-position source; and an auxiliary-force database including data about at least a pedaling rate, a running speed, a current gear ratio and the auxiliary force, for defining a ratio between the running speed and the current gear ratio as a first comparison value, and defining the pedaling rate as a second comparison value wherein an auxiliary-force comparison table is made of levels of the auxiliary force to be output corresponding to the first and second comparison values. The microcomputer uses a determining logic circuit to determine the suitable level of the auxiliary force to be output and control the auxiliary-force providing device to output the auxiliary force in the determined level.

5 Claims, 5 Drawing Sheets

POWER-ASSISTED SYSTEM FOR BICYCLE

BACKGROUND OF THE INVENTION

1. Technical Field

The present invention relates to bicycles, and more particularly, to a power-assisted system working with a bicycle.

2. Description of Related Art

Japan Patent Application Publication No. 2004-243920 has disclosed an power-assisted bicycle, which selectively provides auxiliary force according to the pedaling power and a rotation rate of the bicycle's driving wheel, thereby allowing a cyclist to ride the bicycle in an effort-saving manner.

However, for detecting the pedaling power, the prior-art device must have its crank equipped with a torque sensor that is usually expensive and difficult to install. Particularly, additional processing of the crank is required before installation of such a torque sensor and increases the manufacturing cost. Furthermore, in the event that pedals of the bicycle are unintentionally pedaled, the power-driven auxiliary device that detects the action of the pedals will make the bicycle perform sudden acceleration beyond a cyclist's expectation, which is a main reason of accidents.

Additionally, Japan Patent Application Publication No. 2000-168672 has disclosed another power-assisted bicycle that also selectively provides auxiliary force according to a rotation ratio of the bicycle's driving wheel (rear wheel) and pedaling rate. However, the prior-art device only provides consistent auxiliary force in spite of the shift position where the bicycle is on and is incapable of dynamically adjusting the auxiliary force according to the practical riding needs.

SUMMARY OF THE INVENTION

One primary objective of the present invention is to provide a power-assisted system for a bicycle, wherein the power-assisted system can selectively provide different the levels of the auxiliary force to be outputs of auxiliary force according to practical riding needs.

Another objective of the present invention is to provide a power-assisted system for a bicycle, wherein the power-assisted system works without any torque sensor so is economical.

For achieving the foregoing and other objectives, according to the present invention, the power-assisted system is assembled to a derailleur-equipped bicycle for providing an auxiliary force to the bicycle and comprises: a microcomputer; a pedaling-rate sensor that is assembled to the bicycle and electrically connected to the microcomputer for sensing a pedaling rate of the bicycle and converting the sensed pedaling rate into a pedaling-rate signal that is then transmitted to the microcomputer; a bicycle-speed sensor the is assembled to the bicycle and electrically connected to the microcomputer for sensing a running speed of the bicycle and converting the sensed running speed into a bicycle-speed signal that is then transmitted to the microcomputer; a shift-position source that is electrically connected to the microcomputer for informing the microcomputer of a shift position or a gear ratio the bicycle presently employs; an auxiliary-force database that is for the microcomputer to read and includes data about at least the pedaling rate, the running speed, the current gear ratio and the auxiliary force, for defining a ratio between the running speed and the current gear ratio as a first comparison value, and defining the pedaling rate as a second comparison value, wherein an auxiliary-force comparison table is made of levels of the auxiliary force to be output corresponding to the first and second comparison values; and an auxiliary-force providing device that is electrically connected to the microcomputer and assembled to the bicycle, for providing the auxiliary force to the bicycle, wherein the microcomputer uses a determining logic circuit to determine the suitable level of the auxiliary force to be output and control the auxiliary-force providing device to output the auxiliary force in the determined level, in which the determining logic circuit is for: (1) when the first comparison value and the second comparison value are both small, determining that the pedaling rate is low and the level of the auxiliary force to be output is high; (2) when the first comparison value and the second comparison value are both moderate, determining that the pedaling rate is average and the level of the auxiliary force to be output is moderate; (3) when the first comparison value and the second comparison value are both great, determining that the pedaling rate is high and the level of the auxiliary force to be output is low; (4) determining not to provide the auxiliary force when none of the above three cases is true, and wherein, in the determining logic circuit, whether the first comparison value is small, moderate or great is determined by comparing the current gear ratio of the bicycle with a normal riding speed range of an average cyclist, while whether the second comparison value is small, moderate or great is determined according to a normal pedaling rate range of the average cyclist. Thereby, the power-assisted system can selectively provide small, moderate or great auxiliary force according to practical riding needs. Moreover, the disclosed power-assisted system works without any torque sensor so is economical.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
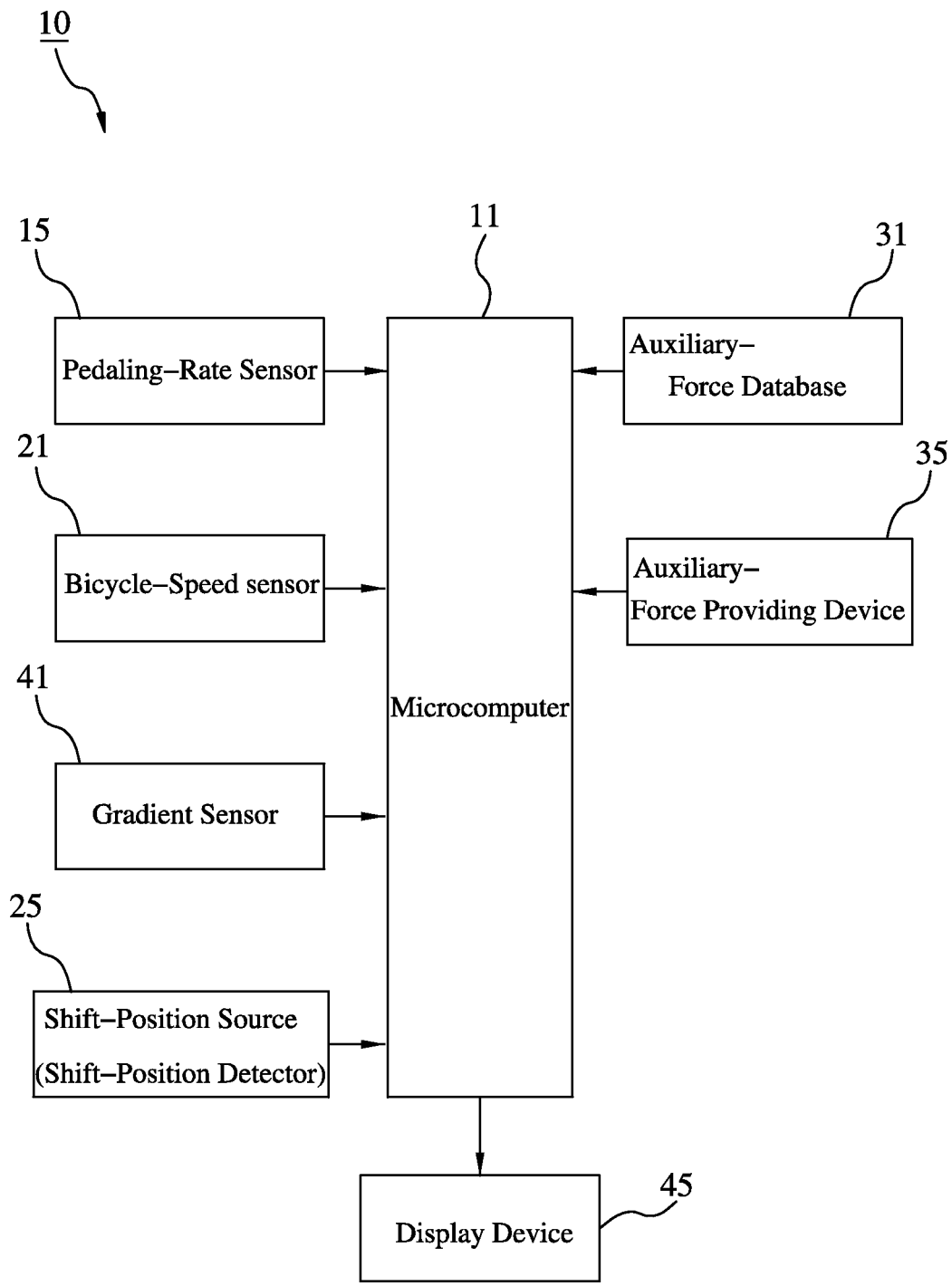
FIG. 1 is a block diagram of a first preferred embodiment of the present invention.
Figure 2:
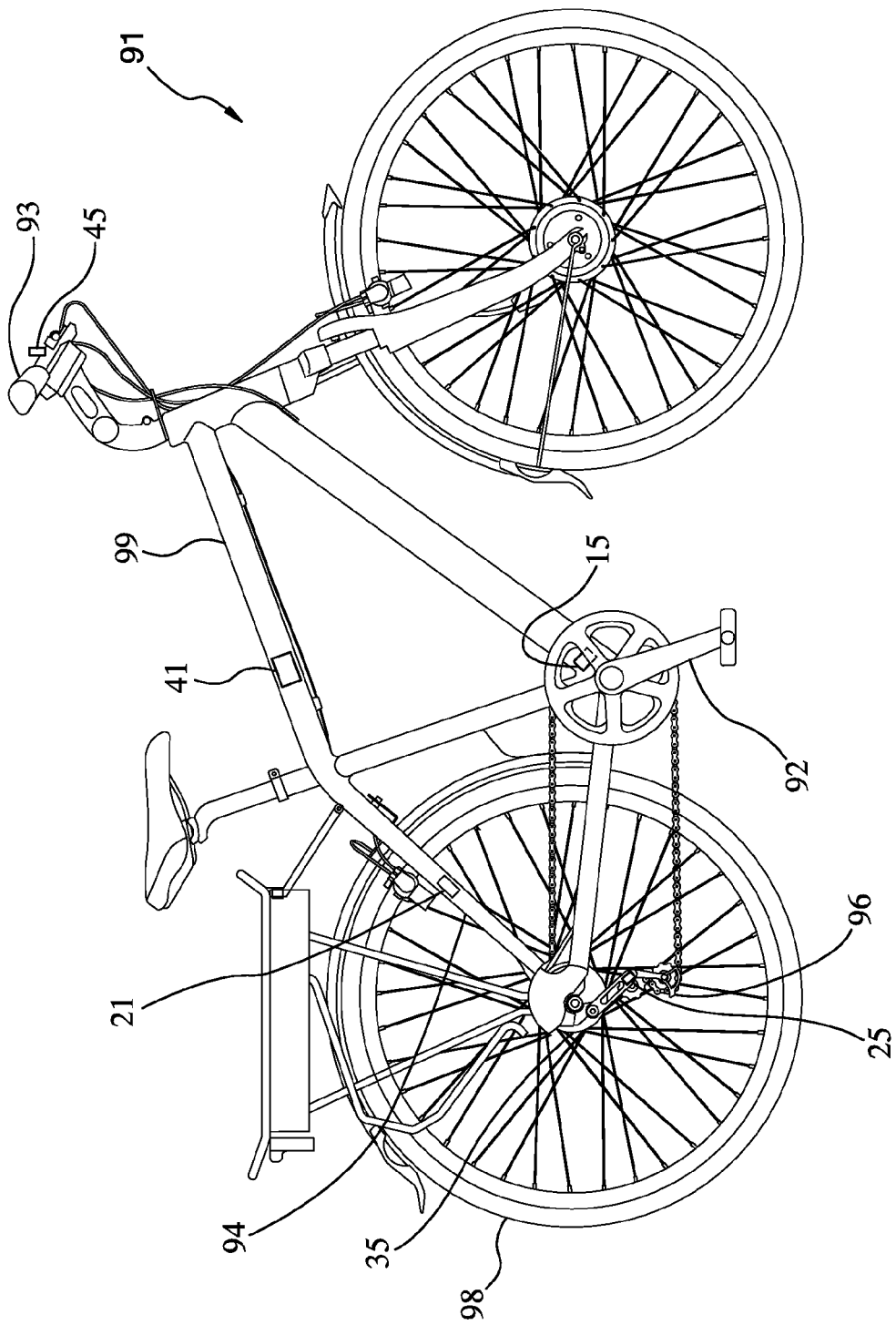
FIG. 2 is an applied view of the first preferred embodiment of the present invention.

Referring to FIG. 1 and FIG. 2, in a first preferred embodiment of the present invention, a power-assisted system 10 is assembled to a derailleur-equipped bicycle 91 for providing an auxiliary force to the bicycle. The power-assisted system 10 primarily comprises a microcomputer 11, a pedaling-rate sensor 15, a bicycle-speed sensor 21, a shift-position source 25, an auxiliary-force database 31, an auxiliary-force providing device 35, a gradient sensor 41 and a display device 45.

The microcomputer 11 has the functions of operation and control. As the microcomputer 11 is known in the art, the detailed description thereto is omitted herein.

The pedaling-rate sensor 15 is assemble to a treadle crank 92 of the bicycle 91 and is electrically connected to the microcomputer 11 for sensing a pedaling rate of the bicycle 91 and converting the sensed pedaling rate into a pedaling-rate signal that is then transmitted to the microcomputer 11.

The bicycle-speed sensor 21 is assemble to a wheel fork 94 of the bicycle 91 and is electrically connected to the microcomputer 11 for sensing a running speed of the bicycle 91 and converting the sensed running speed into a bicycle-speed signal that is then transmitted to the microcomputer 11.

The shift-position source 25 is electrically connected to the microcomputer 11 for informing the microcomputer 11 of a gear ratio the bicycle 91 presently has. In the present embodiment, the shift-position source 25 is a shift-position detector that is installed to the derailleur 96 of the bicycle 91 for detecting the current shift position of the bicycle 91 and using the following shift-position/gear ratio comparison table (Table 1) to convert the sensed shift position into the gear ratio that is then transmitted to the microcomputer 11.

TABLE 1

Shift-Position/Gear Ratio Comparison Table

|  | Shift Position | | | | | | |
| --- | --- | --- | --- | --- | --- | --- | --- |
|  | Shift 1 | Shift 2 | Shift 3 | Shift 4 | Shift 5 | Shift 6 | Shift 7 |
| Gear Ratio | 1.50 | 1.76 | 2.00 | 2.35 | 2.72 | 3.17 | 3.67 |

The auxiliary-force database 31 in the present embodiment is electrically connected to the microcomputer 11 and is for the microcomputer 11 to read. The auxiliary-force database 31 includes data about the pedaling rate, the running speed, the current gear ratio, the gradient and the auxiliary force. The auxiliary-force database 31 defines a ratio between the running speed and the current gear ratio as a first comparison value, and defines the pedaling rate as a second comparison value, while defining the gradient as a third comparison value. An auxiliary-force comparison table is made of levels of the auxiliary force to be output corresponding to the first and second comparison values. In the present embodiment, the following Table 2 that is stored in the auxiliary-force database for the microcomputer 11 to be used for comparison and determination.

TABLE 2

Auxiliary-Force Comparison Table

| First Comparison Value | Second Comparison Value | Third Comparison Value | Output | Pedaling State |
| --- | --- | --- | --- | --- |
| Zero | X | X | 0% | Still |
| X | Zero | X | 0% | No Pedaling |
| Small | Small | Flat | High | Low-Speed Pedaling |
| Moderate | Small | Flat | 0% | Idling |
| Great | Small | Flat | 0% | Idling |
| Moderate | Moderate | Flat | Moderate | Normal Pedaling |
| Great | Moderate | Flat | 0% | Idling |
| Great | Great | Flat | Low | High-Speed Pedaling |
| Small | Small | Uphill | High + 20% | Low-Speed Pedaling |
| Moderate | Small | Uphill | 0% | Idling |
| Great | Small | Uphill | 0% | Idling |
| Moderate | Moderate | Uphill | Moderate + 20% | Normal Pedaling |
| Great | Moderate | Uphill | 0% | Idling |
| Great | Great | Uphill | Low + 20% | High-Speed Pedaling |
| Small | Small | Downhill | High − 20% | Low-Speed Pedaling |
| Moderate | Small | Downhill | 0% | Idling |
| Great | Small | Downhill | 0% | Idling |
| Moderate | Moderate | Downhill | Moderate − 20% | Normal Pedaling |
| Great | Moderate | Downhill | 0% | Idling |
| Great | Great | Downhill | Low − 20% | High-Speed Pedaling |

The auxiliary-force providing device 35 is electrically connected to the microcomputer 11 and is assembled to a driving wheel 98 (i.e. a rear wheel) of the bicycle 91 for providing the auxiliary force to assist the bicycle 91 in moving forward.

The gradient sensor 41 is electrically connected to the microcomputer 11 and is assembled to a frame 99 of the bicycle 91 for sending the gradient and converting the sensed gradient into a gradient signal that is then transmitted to the microcomputer 11.

The display device 45 is assembled to a handle 93 of the bicycle 91 and is electrically connected to the microcomputer 11 for displaying information. In the present embodiment, the display device 45 may display the current shift position of the bicycle 91 or real-time information of, such as, the running speed of the bicycle 91, the heartbeat rate of the cyclist, or the current auxiliary-force providing mode, like economic, normal and racing modes.

The microcomputer 11 implements a determining logic circuit to determine how much of the auxiliary force is to provide, and to control the auxiliary-force providing device 35 to output the auxiliary force in the determined level.

Therein, the determining logic circuit is for:
(1) when the first comparison value and the second comparison value are both small, determining that the pedaling rate is low (heavy load) and the level of the auxiliary force to be output is high;
(2) when the first comparison value and the second comparison value are both moderate, determining that the pedaling rate is average and the level of the auxiliary force to be output is moderate;
(3) when the first comparison value and the second comparison value are both great, determining that the pedaling rate is high and the level of the auxiliary force to be output is low; and
(4) determining the treadles are idling and no auxiliary force to be provided when none of the above three cases is true.

In the foregoing determining logic circuit, whether the first comparison value is small, moderate or great is determined by comparing the current gear ratio of the bicycle 91 with a normal riding speed range of an average cyclist, while whether the second comparison value is small, moderate or great is determined according to a normal pedaling rate range of the average cyclist.

In addition, in the foregoing determining logic circuit, when the third comparison value is one representing non-gradient landform, it is determined that the bicycle is now on a level ground, and the output auxiliary force is not provided. When the third comparison value is one representing uphill landform, it is determined that the bicycle is now on an uphill ground, and the output auxiliary force corresponding to each of the first three cases (1), (2) and (3) of the determining logic circuit is enhanced by a predetermined proportion (such as 20% auxiliary force added). When the third comparison value is one representing downhill landform, it is determined that the bicycle is now on a downhill ground, so the output auxiliary force corresponding to each of the first three cases (1), (2) and (3) of the determining logic circuit is reduced by a predetermined proportion (such as 20% auxiliary force reduced). The output of the determining logic circuit is explained by the above Table 2.

With the understanding of the configuration of the first embodiment of the present invention, the description will be directed to how the present invention operates.

As to the three auxiliary-force providing modes, namely the economic mode, the normal mode and the racing mode, when the power-assisted system is in the economic mode, the relatively small auxiliary force is provided, such as 30% of the maximum output. When the power-assisted system is in the normal mode, the average auxiliary force is provided, such as 50% of the maximum output. When the power-assisted system is in the racing mode, the relatively great auxiliary force is provided, such as 80% of the maximum output. The following example is made basing on the normal mode. In the normal mode, the high, moderate and low auxiliary force as mentioned in the above-mentioned first three cases (1), (2) and (3) of the determining logic circuit, may have following definitions: the high auxiliary force refer to the auxiliary force equal to 60% of the total output of the auxiliary-force providing device 35; the moderate auxiliary force refer to the auxiliary force equal to 50% of the total output of the auxiliary-force providing device 35; and the low auxiliary force refer to the auxiliary force equal to 40% of the total output of the auxiliary-force providing device 35.

As can be seen in Table 2, any state other than the above-mentioned first three cases (1), (2) and (3) of the determining logic circuit is determined as idling. In case of any of the first three cases, the auxiliary force is output correspondingly.

The disclosed system is operated when the bicycle is ridden by a cyclist. During the cyclist's riding, the pedaling-rate sensor 15 senses the cyclist's pedaling rate, and the bicycle-speed sensor 21 senses the bicycle's running speed. Meantime, the current shift position of the bicycle 91 informed by the shift-position source 25 is converted into the gear ratio using Table 1, while the gradient sensor 41 senses the gradient. Data of the pedaling rate, running speed, current shift and gradient are then transmitted to the microcomputer 11, for the microcomputer 11 to compare them with those in Table 2 stored in the auxiliary-force database 31, thereby determining which level of the auxiliary force or no auxiliary force is to be provided. The microcomputer 11 accordingly controls the auxiliary-force providing device 35 to provide the auxiliary force in the determined level. Thereby, the disclosed system can provide auxiliary force for all running speeds, gear ratios and gradients, and output the auxiliary force as small, moderate or great according to the riding conditions, so that the cyclist riding the bicycle is provided with proper auxiliary force, and can ride with less effort.

Thereby, the power-assisted system of the present invention can selectively provide small, moderate or great auxiliary force according to practical riding needs. Moreover, the power-assisted system works without any torque sensor so is helpful to save manufacturing and assembling costs.

Figure 3:
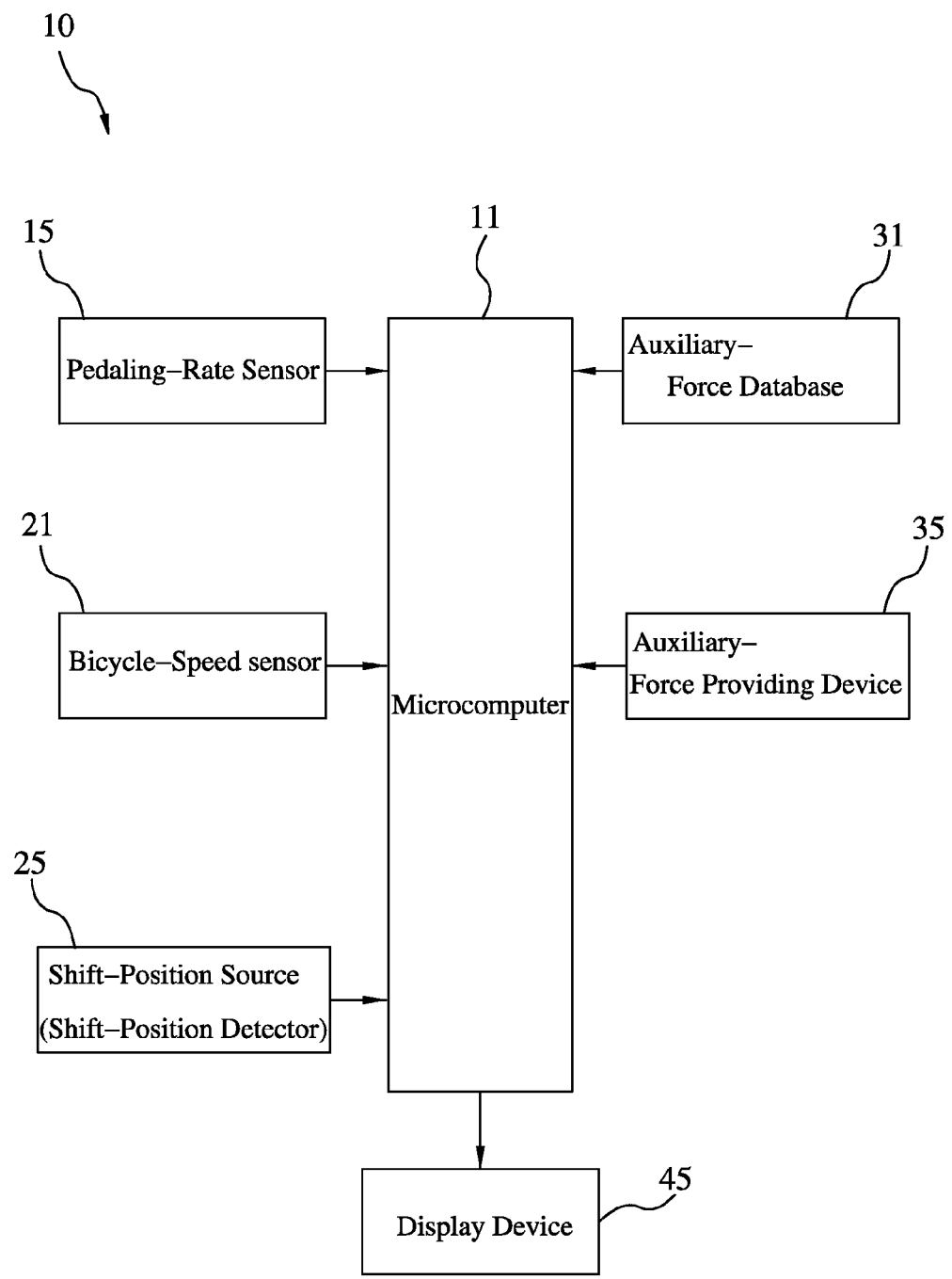
FIG. 3 is a block diagram of an alternative of the first preferred embodiment wherein a gradient sensor is absent.

It is to be noted that, referring to FIG. 3, the first embodiment may have Table 2 excluding the gradient data and have the gradient sensor 41 absent in the system while still being useful to provide auxiliary force. Although the gradient data are helpful to accurate provision of auxiliary force, the system can similarly provide small, moderate or great auxiliary force according to the riding conditions without the gradient data. Thus, the gradient data and the gradient sensor 41 are not essential components of the present invention.

Figure 4:
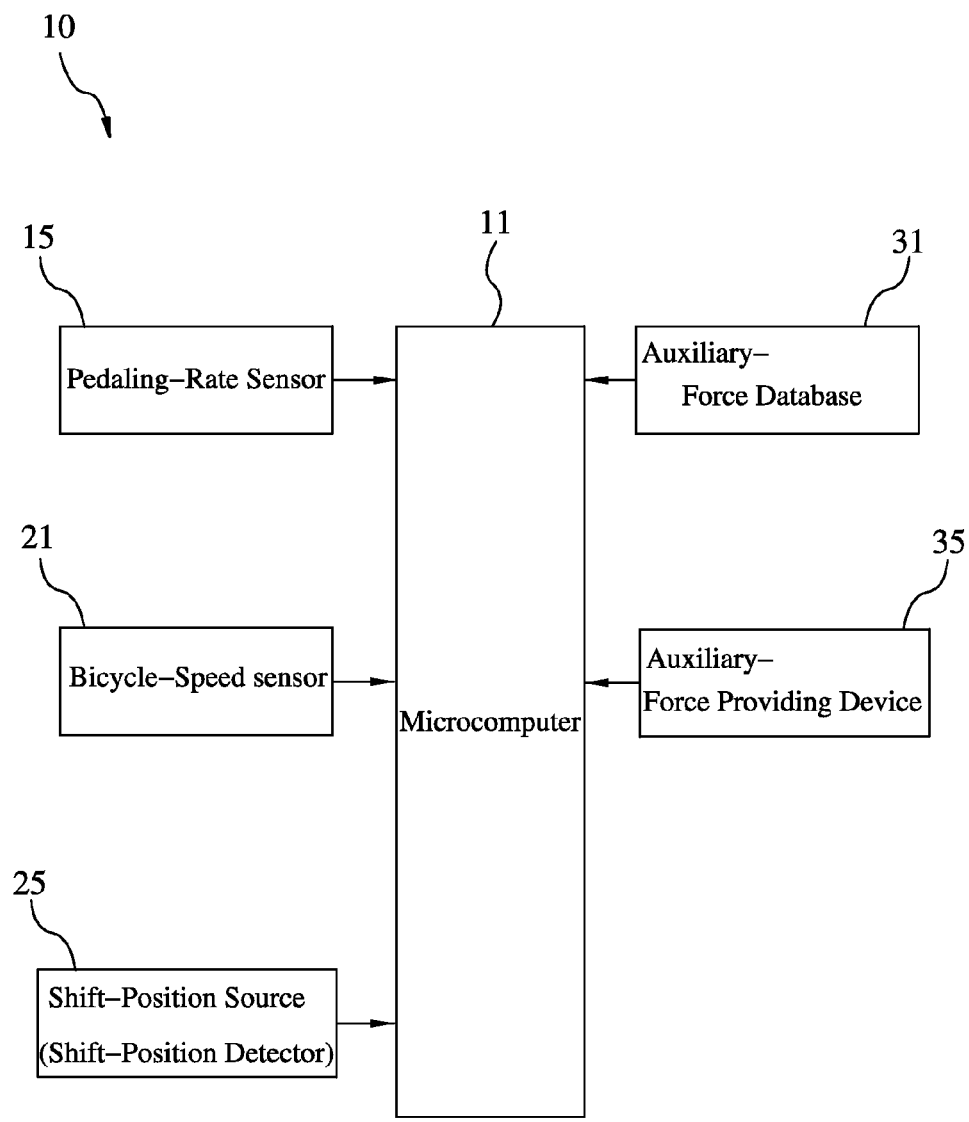
FIG. 4 is a block diagram of another alternative of the first preferred embodiment wherein a gradient sensor and a display device are absent.

In addition, as shown in FIG. 4, the first embodiment may work without the display device 45. Since the display device 45 mainly serves to inform the cyclist of the operating parameters, its absence will not change the ability of the present invention to provide small, moderate or great auxiliary force according to the riding conditions. Thus, the display device 45 is not an essential component of the present invention.

Figure 5:
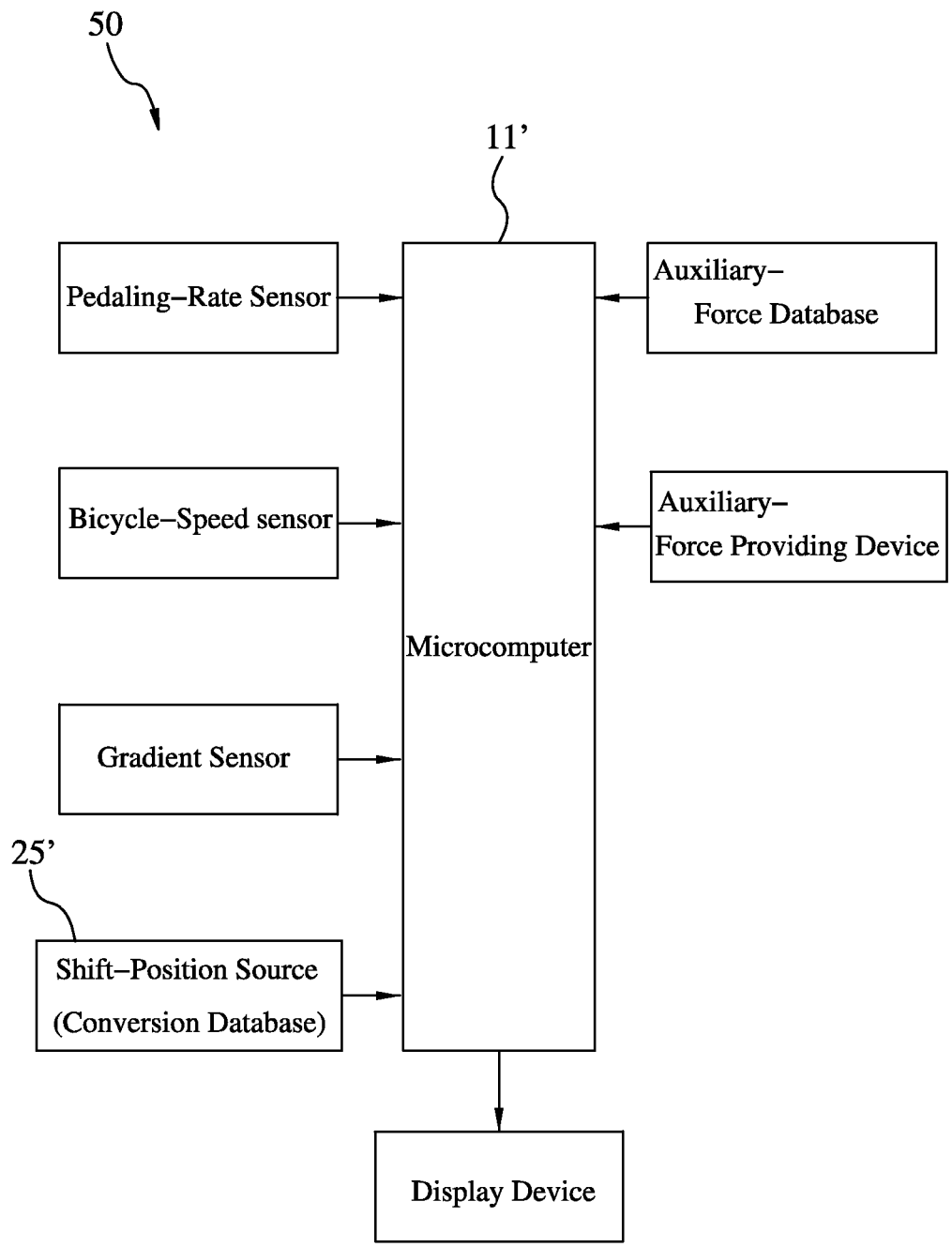
FIG. 5 is a block diagram of a second preferred embodiment of the present invention.

Referring now to FIG. 5, in a second preferred embodiment of the present invention, a power-assisted system 50 is similar to that of the first preferred embodiment, except that the shift-position source 25' is a conversion database instead of the foregoing shift-position sensor. The conversion database includes a running speed/pedaling rate/gear ratio (including the corresponding shift position) comparison table, like Table 3 below. Using this database, the currently employed gear ratio and shift position can be identified from the running speed and the pedaling rate.

TABLE 3

Shift Position Comparison Table

| | Gear Ratio | | | | | | |
|---|---|---|---|---|---|---|---|
| | 1.50 (Shift 1) | 1.76 (Shift 2) | 2.00 (Shift 3) | 2.35 (Shift 4) | 2.72 (Shift 5) | 3.17 (Shift 6) | 3.67 (Shift 7) |
| Running Speed | | | | Pedaling Rate | | | |
| 2 | 9.3 | 7.9 | 7.0 | 5.9 | 5.1 | 4.4 | 3.8 |
| 4 | 18.6 | 15.8 | 13.9 | 11.9 | 10.2 | 8.8 | 7.6 |
| 6 | 27.8 | 23.7 | 20.9 | 17.8 | 15.4 | 13.2 | 11.4 |
| 8 | 37.1 | 31.6 | 27.8 | 23.7 | 20.5 | 17.6 | 15.2 |
| 10 | 46.4 | 39.6 | 34.8 | 29.6 | 25.6 | 22.0 | 19.0 |
| 12 | 55.7 | 47.5 | 41.7 | 35.6 | 30.7 | 26.4 | 22.8 |
| 14 | 64.9 | 55.4 | 48.7 | 41.5 | 35.8 | 30.7 | 26.6 |
| 16 | 74.2 | 63.3 | 55.6 | 47.4 | 41.0 | 35.1 | 30.4 |
| 18 | 83.5 | 71.2 | 62.6 | 53.4 | 46.1 | 39.5 | 34.2 |
| 20 | 92.8 | 79.1 | 69.5 | 59.3 | 51.2 | 43.9 | 37.9 |
| 22 | 102.0 | 87.0 | 76.5 | 65.2 | 56.3 | 48.3 | 41.7 |
| 24 | 111.3 | 94.9 | 83.5 | 71.1 | 61.4 | 52.7 | 45.5 |
| 26 | 120.6 | 102.9 | 90.4 | 77.1 | 66.6 | 57.1 | 49.3 |
| 28 | 129.9 | 110.8 | 97.4 | 83.0 | 71.7 | 61.5 | 53.1 |
| 30 | 139.2 | 118.7 | 104.3 | 88.9 | 76.8 | 65.9 | 56.9 |

In operation, the microcomputer 11' uses the current running speed and pedaling rate as materials to identify the current gear ratio and shift position according to comparison table. Thereby, the shift-position source 25' of the second embodiment can also provide accurate information of the gear ratio and shift position.

The other components, the operation and effects of the second embodiment are similar to those disclosed in the first embodiment, and thus are not discussed at any length herein.

What is claimed is:

1. A power-assisted system being assembled to a derailleur-equipped bicycle for providing an auxiliary force to the bicycle and comprising:
  a microcomputer;
  a pedaling-rate sensor that is assembled to the bicycle and electrically connected to the microcomputer for sensing a pedaling rate of the bicycle and converting the sensed pedaling rate into a pedaling-rate signal that is then transmitted to the microcomputer;
  a bicycle-speed sensor that is assembled to the bicycle and electrically connected to the microcomputer for sensing a running speed of the bicycle and converting the sensed running speed into a bicycle-speed signal that is then transmitted to the microcomputer;

a shift-position source that is electrically connected to the microcomputer for informing the microcomputer of a shift position or a gear ratio that the bicycle presently employs;

an auxiliary-force database that is for the microcomputer to read and includes data about at least the pedaling rate, the running speed, the current gear ratio and the auxiliary force, for defining a ratio between the running speed and the current gear ratio as a first comparison value, and defining the pedaling rate as a second comparison value, wherein an auxiliary-force comparison table is made of levels of the auxiliary force to be output corresponding to the first and second comparison values;

an auxiliary-force providing device that is electrically connected to the microcomputer and assembled to the bicycle, for providing the auxiliary force to the bicycle, wherein the microcomputer uses a determining logic circuit to determine the suitable level of the auxiliary force to be output and control the auxiliary-force providing device to output the auxiliary force in the determined level;

in which the determining logic circuit is for:

(1) when the first comparison value and the second comparison value are both small, determining that the pedaling rate is low and the level of the auxiliary force to be output is high;

(2) when the first comparison value and the second comparison value are both moderate, determining that the pedaling rate is average and the level of the auxiliary force to be output is moderate;

(3) when the first comparison value and the second comparison value are both great, determining that the pedaling rate is high and the level of the auxiliary force to be output is low; and (4) determining not to provide the auxiliary force when none of the above three cases is true, wherein, for the determining logic circuit, there are three segments between a maximum value and a minimum value of the motor auxiliary force and the three segments are indicative of the output high, moderate, and low auxiliary forces, respectively, and whether the first comparison value is small, moderate or great is determined by comparing the current gear ratio of the bicycle with a normal riding speed range of an average cyclist, wherein the gear ratios are divided into great, moderate, or small according to a corresponding shift position, such that when the shift position is high, moderate, or low, the corresponding gear ratio is great, moderate or small, respectively, and whether the second comparison value is small, moderate or great is determined according to a normal pedaling rate range of the average cyclist, wherein the normal pedaling rate of the average cyclist is divided into three segments indicative of high, moderate and low rates, respectively.

2. The power-assisted system of claim 1, wherein the shift-position source is a conversion database including a running speed/pedaling rate/gear ratio comparison table, so that the gear ratio that the bicycle presently employs is allowed to be identified by referring to the current running speed and the current pedaling rate.

3. The power-assisted system of claim 1, wherein the shift-position source is a shift-position detector that is installed to the bicycle for detecting the shift position that the bicycle presently employs.

4. The power-assisted system of claim 1, further comprising a gradient sensor that is electrically connected to the microcomputer and is assembled to the bicycle for sensing a gradient and converting the sensed gradient into a gradient signal that is then transmitted to the microcomputer, wherein the auxiliary-force database further contains data of the gradient that is defined as a third comparison value and incorporated in the auxiliary-force comparison, and in the determining logic circuit, when the third comparison value represents uphill landform, the levels of the auxiliary force output according to (1), (2) and (3) are all enhanced by a predetermined proportion, while when the third comparison value represents downhill landform, the levels of the auxiliary force output according to (1), (2) and (3) are all reduced by a predetermined proportion.

5. The power-assisted system of claim 1, further comprising a display device that is assembled to the bicycle and is electrically connected to the microcomputer for displaying information.

* * * * *